UNITED STATES PATENT OFFICE.

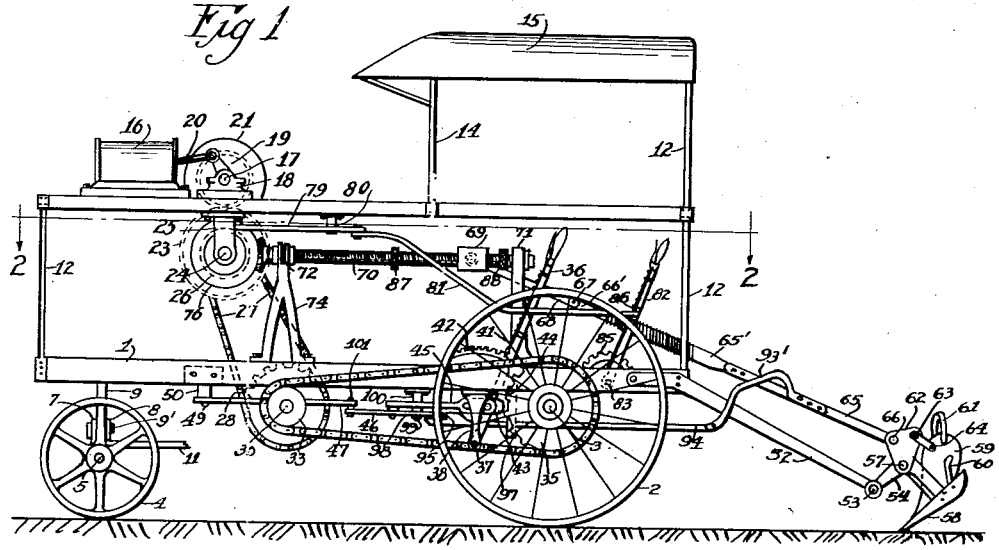

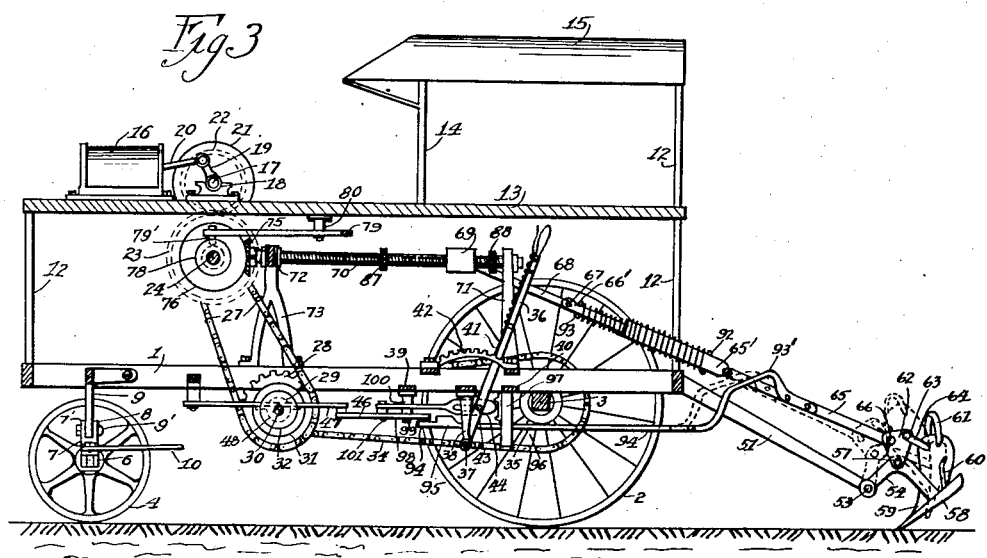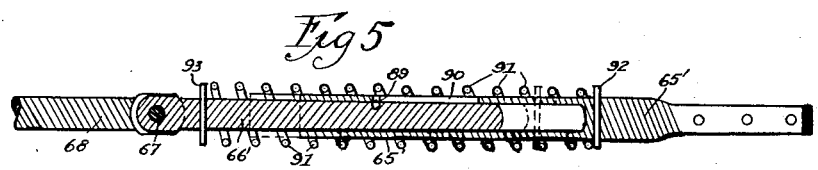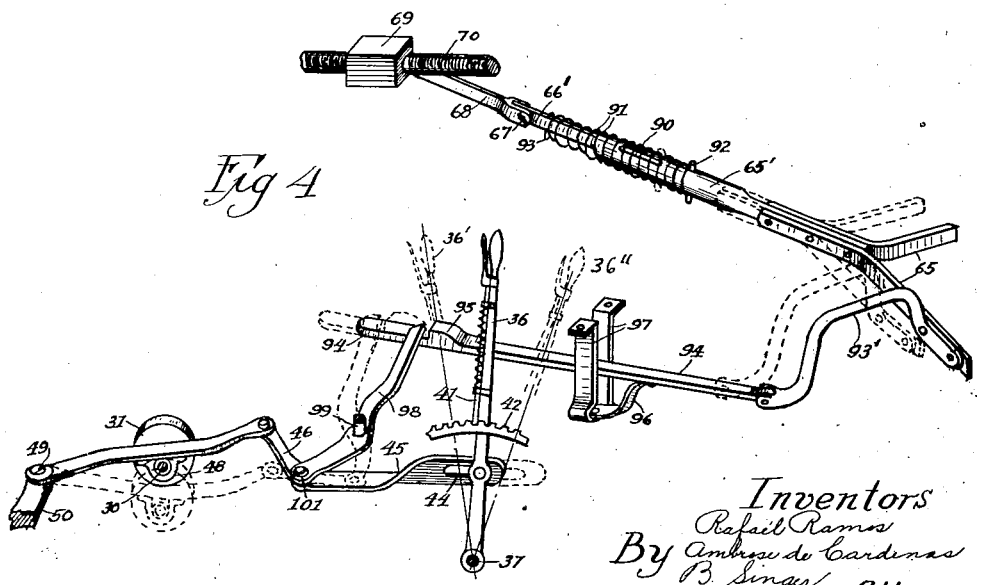

RAFAÉL RAMOS AND AMBROSE DE CARDENAS, OF AGUADA DE PASAJEROS, SANTA CLARA, CUBA.

PLOWING-MACHINE.

1,347,589.  Specification of Letters Patent.  Patented July 27, 1920.

Application filed May 19, 1919. Serial No. 298,235.

*To all whom it may concern:*

Be it known that we, RAFAÉL RAMOS and AMBROSE DE CARDENAS, citizens of the Republic of Cuba and of the United States of America, respectively, both residents at Colonia "La Caoba," District of Aguada de Pasajeros, Province of Santa Clara, Cuba, have invented certain new and useful Improvements in Plowing-Machines, of which the following is a full, clear, and exact specification.

The invention relates to tractors of the kind in which a trailer is pivotally secured to the frame of the tractor.

The principal object of the invention aims to the provision of means for automatically stopping the tractor when the trailer strikes an obstruction on the ground.

A further object aims at the provision of a sliding abutment means connecting the trailer with the clutch of the driving mechanism for the tractor whereby the clutch is disengaged when the trailer strikes an obstruction on the ground.

With these and other objects in view, which will become apparent as the description proceeds, the invention comprises means described in the following specification, particularly pointed out in the claims forming a part thereof, and illustrated in the accompanying drawings in which:

Figure 1 is a side elevation of a plowing machine which is provided with the improvements forming the subject matter of this invention;

Fig. 2 is a horizontal section of the machine on line 2—2 of Fig. 1;

Fig. 3 is a vertical longitudinal section of the machine;

Fig. 4 is a perspective detail view showing the safety mechanism connecting the plow's supporting frame with the drive shaft; and, Fig. 5 is a detail section showing the telescope and resilient connection of the plow's supporting frame with its actuating mechanism.

The tractor comprises a chassis 1 provided with a pair of traction wheels 2 located at the rear part of the machine and mounted on a shaft 3 journaled in bearings depending from the sides of chasses 1 and with a pair of steering wheels 4 located at the front part of the machine and arranged on horizontal trunnions 5 projecting laterally from arms 6 articulated with the ends of a horizontal bar 7 provided at its center with an upstanding fork receiving between its prongs 7' and 8 a cross-tie 9 of chassis 1 which is pivotally secured by a pin 9'. The front wheels 4 are actuated by a steering mechanism including rods 10 and 11 articulated to the arms 6. A working platform 13 is supported by the chassis 1 by means of posts 12 and the rear posts 12 are extended and coöperate with posts 14 to hold a shade 15 for protecting the operator against sunshine and rain.

The traction wheels 2 are driven from an engine 16 supported on the fore part of platform 13, by means of a mechanism comprising a driving shaft 17 horizontally arranged in transverse position and journaled in bearings 18 fixed on platform 13, said driving shaft 17 having a crank 19 through which it connects with the connecting rod 20 articulated to the piston of the engine, and on said driving shaft 17 are secured a fly-wheel 21 and a gear wheel 22 meshing with another gear wheel 23 secured on a horizontal transverse shaft 24, journaled in bearings 25 secured beneath platform 13 and on which is fixed at the side of gear wheel 23 a sprocket wheel 26 connected by means of an endless chain 27 with another sprocket wheel 28 fixed on a long sleeve 29 loosely mounted on a third transverse horizontal shaft 30 rotatably mounted in bearings secured beneath the sides of chassis 1, said sleeve 29 having rigidly connected at its end one of the plates 31' of a clutch, the gear plate 31 of which forms part of the grooved sleeve 32 splined on shaft 30, and at each end of shaft 30 is fixed a sprocket wheel 33 which is connected through an endless chain 34 with a sprocket wheel 35 keyed to the shaft 3 between the traction wheels 2 and the chassis 1. The clutch of shaft 30 is actuated by means of a hand lever 36 pivoted at its lower end at 37 to a bracket 38 secured to cross-bars 39 and 40 of chassis 1, and said lever is provided with a pawl 41 engaging a gear segment 42 fixed on the two cross-bars 39 and 40, said lever 36 entering with a horizontal pin 43 into an elongated horizontal slot 44 of a connecting bar 45 twisted at its center and connected by means of a link 46 with the end of a lever 47 provided with an arcuate member 48 received in the groove of sliding sleeve 32. The lever 47 is pivoted at 49 to a support 50 secured to the inner side of chassis 1.

On the ends of two projecting brackets 51 and 52 secured to the rear of chassis 1 is supported a transverse horizontal bar 53 serving as a pivot for two or more inverted V-shaped arms 54 which are prevented from sliding on said bar 53 by collars 55 and 56 fixed to said bar 53, and said arms 54 are interconnected at their center by a transverse horizontal bar 57, and on the other end of said arms 54 are fixed a grate 58 and a mold-board 59, each grate and mold-board being reinforced by plates 60, and each pair of mold-boards 59 being interconnected by a curved plate 61. On the end portions of bar 57 are mounted two triangular plates 62 which are also interconnected by another horizontal bar 63, and to which are connected in turn the mold-boards 59 by means of plates 64. In this manner a supporting frame for the plows 58, 59 is formed which frame is pivoted on shaft 53 so that the plows may be adjusted with respect to the ground, and this motion is obtained by means of a mechanism consisting of an inclined fork-shaped member 65, the two divergent branches of which are connected to the triangular plates 62 by inwardly projecting pins 66 entering the eyed ends of said branches. The central stem 65' of said fork is tubular for telescoping arrangement with a stem 66' articulated at 67 with the forked end of an inclined arm 68 pivotally connected to a nut 69 on a screw shaft 70 which is journaled at one end in a standard 71 secured to the cross-bar 40 and at the other end in a vertical supporting plate 72 secured at its end on standards 73 and 74 fixed on the sides of chassis 1. The screw shaft 70 carries at its front end a beveled pinion meshing with a beveled gear 76 loosely mounted on shaft 24 and provided with a small hub plate 77 adapted to engage a coupling 78 splined to said shaft 24. The coupling is actuated by a crank lever 79, having at one of its ends a small roller 79' entering a groove 78' of the coupling 78. The lever 79 is pivoted on a support 80 depending from the platform 13, the other end of said lever being connected by a curved long link 81 with a hand lever 82 pivoted at 83 on a supporting piece 84 fixed to the inner side of chassis 1 and having at its top a gear segment 85 with which a catching pawl 86 slidably mounted on lever 82 engages. On the screw shaft 70 nuts 87 and 88 are arranged which serve as abutments for the sliding nut 69 so as to limit its movement on said screw. The telescope connection between the tubular stem 65' of the member 65 and stem 66' has a movement of limited extension by means of a pin 89 projecting from stem 66' and fitting in a groove 90 formed in the wall of tube 65', both stems being surrounded by a coil spring 91 held at its ends between pins 92 and 93, respectively, secured through both stems.

To one of the divergent branches of member 65 is fixed by means of screws a downwardly curved arm 93' which pivotally connects at its fore-forked end with the rear end of a horizontal bar 94 directed to the front and provided with an abutment 95 near its fore end and said bar 94 is slidably bearing against a spring plate 96 inside a U-shaped guiding piece 97 fixed beneath the cross-bar 40 and on whose lower portion is fixed the plate 96, and the abutment 95 engages in a certain position the end of a lever 98 pivoted at 99 on a bracket 100 fixed to cross-bar 39, the other end of said lever 98 being pivotally secured by a pin 101 to the pivotal connection of bar 45 and link 46.

The operation of the machine is as follows: To propel the machine, the hand lever 36 after release of the catching pawl 41 is moved forward until attaining the position 36' indicated with dotted lines in Fig. 4 of the drawings, whereby the bar 45 and the link 46 will be pushed forward and the lever 47 of coupling 32 will be oscillated, thus coupling sleeve 29 with shaft 30. A drive is thereby imparted to the traction wheels 2 through the sprocket wheels 33 and 35 and the endless chain 34. Then the hand lever 36 is again pushed back on the gear segment 42 until it attains the position indicated in full lines in Fig. 4, and this movement does not affect the lever 47 of coupling 32 owing to the slot 44 of the connecting bar 45. The grates 58 and the mold-boards 59 have been previously arranged in proper working position by means of hand lever 82 which in actuating the coupling 78 through the lever 79 rotates the screw shaft 70 and slides the fixed nut 69 connected to the fork member 65, thus oscillating on shaft 53 the pieces 54 carrying the grates 58 and the mold-boards 59. Whenever the grates 58 strike against any obstruction on the ground whose resistance should be greater than the elastic tension of the coil spring 91 surrounding the telescoping connection 65', 65, the resistance of the obstruction will raise the grates 58 and the mold-boards 59 by oscillating on shaft 53, into the position indicated in dotted lines in Fig. 3 of the drawings. This movement will cause the member 65 to be pushed forward against the tension of spring 91 and the tube 65' to slide on the stem 66, and at the same time the abutment bar 94 will also be pushed forward owing to its connection with arm 93' fixed to said member 65, and the shoulder 95 will push forward the free end of lever 98. This movement causes disengagement of coupling 32, and interruption of the drive to the traction wheels 3. In this manner the machine will not continue its travel when striking an obstruction on the ground, and the grates and moldboards will not be injured by said obstruction. After removal of the obstruction, the machine can resume its travel at the same place where it stopped by moving forward the lever 36 and immediately backward to the rear end of the groove 44, that is to position indicated in full lines in Fig. 4, in which position, when it is desired to stop the machine, it is only necessary to move farther backward the hand lever 36 to the position 36" indicated in dotted lines in Fig. 4, so as to disengage the coupling 32.

It is obvious that the form of the connections can be slightly changed without altering the spirit of the invention, which is as pointed out in the following claim.

We claim:

1. In combination with the frame of a tractor, a trailer pivotally secured to said frame, a driving mechanism including a clutch for the traction wheels of the tractor, and a bar provided with a shoulder connecting the trailer with said clutch to disengage the latter when the trailer strikes an obstruction on the ground.

2. In combination with the frame of a tractor, a bar to the rear of and supported by said frame, a trailer pivotally secured to said bar, a driving mechanism including a clutch for the traction wheels of the tractor, and a bar provided with a shoulder interposed between said trailer and clutch to disengage the latter when the trailer strikes an obstruction on the ground.

3. In combination with the frame of a tractor, a bar horizontally supported by brackets projecting rearwardly from the frame, a trailer pivotally secured to said bar, a driving mechanism, longitudinally sliding means connected to the trailer, lever actuated means for connecting said sliding means with said driving mechanism, means for connecting the driving mechanism with the traction wheels of the tractor, said means comprising a lever actuated clutch, and longitudinally sliding means connecting the trailer with said clutch for disengaging the latter when the trailer strikes an obstruction on the ground.

4. In combination with the frame of a tractor, a bar horizontally supported by brackets projecting rearwardly from the frame, a trailer pivotally secured to said bar, a driving mechanism, longitudinally sliding means connected to the trailer, a telescoping and resilient connection interposed in said sliding means, lever actuated means for connecting said sliding means with said driving mechanism, means including a lever and a clutch actuated thereby for connecting the traction wheels of said tractor to said driving mechanism, and sliding abutment means connecting the trailer with said clutch for disengaging the latter when the trailer strikes an obstruction on the ground.

5. In combination with the frame of a tractor, a bar horizontally supported by brackets projecting rearwardly from the frame, a trailer pivotally secured to said bar, a driving mechanism, longitudinally sliding means connected to the trailer, a telescoping and resilient connection interposed in said sliding means, lever actuated means for connecting said sliding means with said driving mechanism, means including a lever and a clutch actuated thereby for connecting the traction wheels of said tractor to said driving mechanism, the connection between the lever and the clutch being provided with a slot to permit a limited idle movement of the lever, and sliding abutment means connecting the trailer with said clutch for disengaging the latter when the trailer strikes an obstruction on the ground.

6. In combination with the frame of a tractor, a bar horizontally supported by brackets projecting rearwardly from the frame, a trailer pivotally secured to said bar, a driving mechanism, longitudinally sliding means connected to the trailer, a telescoping and resilient connection interposed in said sliding means, lever actuated means for connecting said sliding means with said driving mechanism, means including a lever and a clutch actuated thereby for connecting the traction wheels of said tractor to said driving mechanism, the connection between the lever and the clutch being provided with a slot to permit a limited idle movement of the lever, an abutment bar articulated to the trailer, and a lever pivotally secured to the tractor frame and articulated to the connection between said clutch and its actuating lever, said pivotally secured lever being adapted to be engaged by said abutment bar and to cause disengagement of said clutch when the trailer strikes an obstruction on the ground.

In witness whereof we affix our signatures.

RAFAËL RAMOS.
AMBROSE DE CARDENAS.